P. WERNI.
Air Gas Machines.
No. 141,973. Patented August 19, 1873.
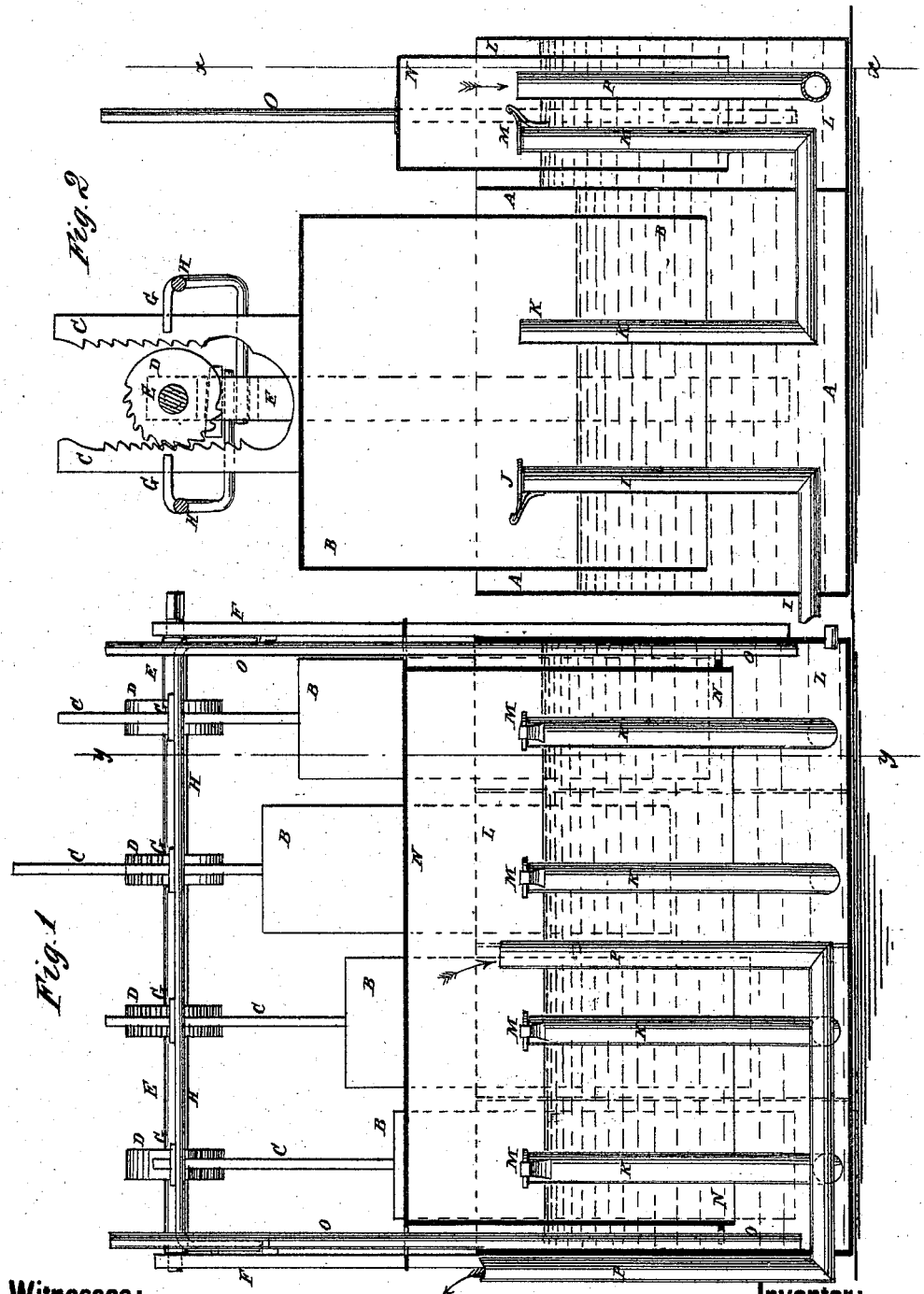

UNITED STATES PATENT OFFICE.

PELAG WERNI, OF NEWARK, NEW JERSEY.

IMPROVEMENT IN AIR GAS-MACHINES.

Specification forming part of Letters Patent No. 141,973, dated August 19, 1873; application filed June 7, 1873.

*To all whom it may concern:*

Be it known that I, PELAG WERNI, of Newark, in the county of Essex and State of New Jersey, have invented a new and useful Improvement in Air Apparatus for Gas-Machines, of which the following is a specification:

Figure 1 is a detail vertical section of my improved machine taken through the line $x x$, Fig. 2. Fig. 2 is a detail vertical section of the same taken through the line $y y$, Fig. 1.

Similar letters of reference indicate corresponding parts.

My invention has for its object to furnish an improved apparatus for forcing air in uniform quantities into a carbureter, and which shall be simple in construction, convenient in use, and effective and reliable in operation. The invention consists in the combination of the series of water-sealed vessels, the toothed uprights, the segmental-toothed gear-wheels, the shafts, the inlet-pipes provided with valves at their inner ends, the outlet-pipes provided with valves at their outer ends, the water-sealed vessels, and the discharge-pipe with each other, as hereinafter fully described.

A represents a series of four, more or less, open-topped vessels, which are designed to be nearly filled with water. In the vessels A are placed a corresponding series of open-bottomed vessels B. To the closed tops of the vessels B are attached the lower ends of two parallel uprights, C, or the lower end of a slotted upright, C. Upon the inner edges of the uprights C are formed ratchet-teeth, into which mesh the teeth formed upon the segmental gear-wheels D, which wheels as they revolve mesh alternately in the teeth of the uprights C, so as to raise and lower the vessels B by a positive movement. This movement was invented by me and is fully described in Letters Patent No. 129,771, dated July 23, 1872, and issued to Pelag Werni and Henry Curtiss. The wheels D are all attached to the shaft E, and are so arranged that some of the vessels B will always be moving upward and some downward. The shaft E revolves in bearings in the posts F, or in other suitable supports. G are slotted guides, in which the uprights C move up and down, and which are attached to the rods H, the ends of which are bent downward and inward, and are secured to the posts F, or to other suitable supports. I are pipes passing in through the lower parts of the vessels A, and rising in the interior of the vessels B above the water in the said vessels A. The pipes I at their inner ends are provided with valves J opening upward, so that when a vacuum is formed by the rise of the vessels B the air may raise the valves J, and enter the space above the water in the vessels B. As the vessels B descend the valves J are closed, and the air is forced out through the pipes K. The pipes K pass out through the lower part of the vessels A, enter the lower part of the vessel L, and have valves M opening upward attached to their upper ends, to prevent the air from returning through the pipes K as the vessels B again move upward. The vessel L is made open topped, and is provided with an open-bottomed vessel, N, which moves up and down upon guides O, and by its weight forces the air out in a continuous and uniform stream through the pipe P into the carbureter. The shaft E is driven by a weight, a spring, or by any other convenient power.

Having thus described my invention, I claim as new and desire to secure by Letters Patent—

1. The combination, with a series of topless chambers, A, of a series of bottomless chambers, B, that successively move into the former at the times, in the manner and for the purpose described.

2. An air-pipe, L, having upwardly-opening valve J, connected, as described, with chambers A B, as and for the purpose set forth.

PELAG WERNI.

Witnesses:
JAMES T. GRAHAM,
T. B. MOSHER.